US012594709B2

(12) United States Patent
Matsuda et al.

(10) Patent No.: US 12,594,709 B2
(45) Date of Patent: Apr. 7, 2026

(54) DIE, METHOD OF MANUFACTURING DIE, EXTRUDER AND METHOD OF MANUFACTURING PELLET

(71) Applicant: THE JAPAN STEEL WORKS, LTD., Tokyo (JP)

(72) Inventors: Soichiro Matsuda, Tokyo (JP); Hiroyuki Kawano, Tokyo (JP); Tomonori Hashimoto, Tokyo (JP); Fumiya Yamabe, Tokyo (JP); Naoki Ueda, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 435 days.

(21) Appl. No.: 17/770,619

(22) PCT Filed: Oct. 21, 2019

(86) PCT No.: PCT/JP2019/041373
§ 371 (c)(1),
(2) Date: Apr. 20, 2022

(87) PCT Pub. No.: WO2021/079413
PCT Pub. Date: Apr. 29, 2021

(65) Prior Publication Data
US 2022/0410459 A1     Dec. 29, 2022

(51) Int. Cl.
B29C 48/345       (2019.01)
B29C 48/00         (2019.01)
(Continued)

(52) U.S. Cl.
CPC ........ B29C 48/345 (2019.02); B29C 48/0022 (2019.02); B29C 48/05 (2019.02);
(Continued)

(58) Field of Classification Search
None
See application file for complete search history.

(56) References Cited

U.S. PATENT DOCUMENTS 5,989,009 A     11/1999   Matsuo
7,846,360 B2    12/2010   Casalini
(Continued)

FOREIGN PATENT DOCUMENTS

CN          101288986 A   * 10/2008
CN          101596753 A   * 12/2009
(Continued)

OTHER PUBLICATIONS

Extended European search report issued Sep. 18, 2023, in European Patent Application No. 19950120.6.
(Continued)

*Primary Examiner* — Susan D Leong
*Assistant Examiner* — Xinwen Ye
(74) *Attorney, Agent, or Firm* — Potomac Law Group, PLLC

(57) ABSTRACT

A performance of a die is improved. An injection hole IH, a nozzle NZa and a nozzle NZb are formed in a center member DIa of a die DI to extend from an extrusion surface ES to an injection surface IS. A heat source HT and a plurality of heat insulating layers HI1 are arranged inside the center member DIa. One of the plurality of heat insulating layers HI1 is adjacent to the nozzle Nzb and is closer to the extrusion surface ES than the heat source HT. The other of the plurality of heat insulating layers HI1 extends in a direction from the extrusion surface ES toward the injection surface IS at a position being farther from the nozzle NZb than the heat source HT.

12 Claims, 11 Drawing Sheets

(51) Int. Cl.

| | |
|---|---|
| *B29C 48/05* | (2019.01) |
| *B29C 48/30* | (2019.01) |
| *B29C 48/86* | (2019.01) |
| *B29C 48/88* | (2019.01) |
| *B33Y 80/00* | (2015.01) |

(52) U.S. Cl.

CPC .......... *B29C 48/3003* (2019.02); *B29C 48/86* (2019.02); *B29C 48/919* (2019.02); *B33Y 80/00* (2014.12)

(56) References Cited

U.S. PATENT DOCUMENTS

| | | | |
|---|---|---|---|
| 2004/0115298 A1 | 6/2004 | Hehenberger et al. | |
| 2010/0040716 A1 | 2/2010 | Fridley | |
| 2010/0129479 A1* | 5/2010 | Banerjee | B29C 48/345 |
| | | | 427/135 |
| 2012/0207864 A1 | 8/2012 | Fridley | |
| 2014/0328961 A1 | 11/2014 | Fridley | |
| 2015/0132424 A1* | 5/2015 | Robertson | B29C 48/05 |
| | | | 29/525.01 |
| 2015/0224699 A1 | 8/2015 | Larsen et al. | |
| 2016/0144548 A1* | 5/2016 | Fridley | B29C 48/05 |
| | | | 425/464 |
| 2016/0193768 A1 | 7/2016 | Jenko | |
| 2017/0120516 A1 | 5/2017 | Larsen et al. | |

FOREIGN PATENT DOCUMENTS

| | | | | |
|---|---|---|---|---|
| CN | 105612037 | A | | 5/2016 |
| CN | 106393473 | A | | 2/2017 |
| CN | 106541509 | A | | 3/2017 |
| EP | 0305862 | A | * | 3/1989 |
| EP | 0305862 | A1 | | 3/1989 |
| JP | H10-264151 | A | | 10/1998 |
| JP | 2004-074692 | A | | 3/2004 |
| JP | 2012-500131 | A | | 1/2012 |
| JP | 2015-147414 | A | | 8/2015 |
| JP | 2019-162883 | A | | 9/2019 |
| KR | 10-2010-0101169 | A | | 9/2010 |
| KR | 10-2017-0084322 | A | | 7/2017 |
| WO | WO 2009/104671 | A1 | | 8/2009 |
| WO | 2022/201618 | A1 | | 9/2022 |

OTHER PUBLICATIONS

Office Action issued Dec. 27, 2023, in Chinese Patent Application No. 201980101186.0.

Office Action issued Jul. 23, 2024, in Chinese Patent Application No. 201980101186.0.

International Search Report for International Patent Application No. PCT/JP2019/041373, Jan. 28, 2020.

Written Opinion of the International Searching Authority for International Patent Application No. PCT/JP2019/041373, Jan. 28, 2020.

Office Action issued Nov. 19, 2024, in Korean Patent Application No. 10-2022-7013270.

Office Action issued Jan. 23, 2026, in Chinese Patent Application No. 201980101186.0.

* cited by examiner

CROSS SECTION A-A

WITHOUT HEAT INSULATING LAYER

WITH HEAT INSULATING LAYER

TEMPERATURE: T7 > T6 > T5 > T4 > T3 > T2 > T1

<u>CROSS SECTION B-B</u>

CROSS SECTION C-C

DIE, METHOD OF MANUFACTURING DIE, EXTRUDER AND METHOD OF MANUFACTURING PELLET

TECHNICAL FIELD

The present invention relates to a die, a method of manufacturing a die, an extruder including a die, and a method of manufacturing a pellet using the extruder, and is preferably applied to, for example, a die having an insulating layer.

BACKGROUND ART

Related-art manufacturing of a pellet made of a thermoplastic resin (such as polypropylene (PP)) has a problem of resin solidifying (clogging) phenomenon when a molten resin passes a nozzle hole inside a plate body of a die.

For example, a Patent Document 1 discloses a technique of arrangement of an air chamber for heat insulation between a die surface and a cover plate in a periphery of a nozzle hole inside a die plate body.

RELATED ART DOCUMENT

Patent Document

Patent Document 1: International Patent Publication WO/2012/500131

SUMMARY OF THE INVENTION

Problems to be Solved by the Invention

When a thermoplastic resin (such as PP) is manufactured to be a pellet by an extruder, it is necessary to improve a quality of the pellet, and a technique of improving equality of a particle size of the pellet is particularly important.

Other objects and novel characteristics will be apparent from the description of the present specification and the accompanying drawings.

Means for Solving the Problems

A die according to one embodiment includes: an extrusion surface; an injection surface opposite to the extrusion surface; a first member made of a first metallic material; an injection hole formed from a surface of the first member into the first member, the surface being close to the injection surface; and a first nozzle formed inside the first member and connected to the injection hole. The die further includes: a second nozzle formed from a surface of the first member into the first member, the surface being close to the extrusion surface, connected to the first nozzle, and having a smaller average opening diameter than an average opening diameter of the first nozzle; and a first heat source arranged inside the first member not to overlap the first nozzle and the second nozzle in a plan view viewed from the extrusion surface. In this case, a plurality of first heat insulating layers having a lower thermal conductivity than a thermal conductivity of the first metallic material are arranged inside the first member, and one (some) of the plurality of first heat insulating layers is adjacent to the second nozzle and is closer to the extrusion surface than the first heat source while the other of the plurality of first heat insulating layers extends in a direction from the extrusion surface toward the injection surface at a position being farther from the second nozzle than the first heat source.

A method of manufacturing a die according to one embodiment includes: a step (a) of preparing a first member manufactured by a 3-D printer to have an extrusion surface and an injection surface opposite to the extrusion surface and to be made of a first metallic material; a step (b) of preparing a second member made of a second metallic material; a step (c) of preparing a hard plate having higher hardness than that of the first metallic material; a step (d) of bonding the second member to the first member to surround the first member in a plan view viewed from the extrusion surface; and a step (e) of bonding the hard plate to a surface of the first member, the surface being close to the extrusion surface. In this case, the first member includes: an injection hole formed from a surface of the first member into the first member, the surface being close to the injection surface; a first nozzle formed inside the first member and connected to the injection hole; and a second nozzle formed from a surface of the first member into the first member, the surface being close to the extrusion surface, connected to the first nozzle, and having a smaller average opening diameter than an average opening diameter of the first nozzle. The first member includes a plurality of first holes for a first heat insulating layer formed inside the first member and a second hole for a first heat source formed inside the first member not to overlap the first nozzle and the second nozzle in a plan view. One (some) of the plurality of first holes is adjacent to the second nozzle and is closer to the extrusion surface than the second hole while the other of the plurality of first holes extends in a direction from the extrusion surface toward the injection surface at a position being farther from the second nozzle than the second hole, and a third nozzle penetrating the hard plate and connected to the second nozzle is formed in the hard plate.

Effects of the Invention

One embodiment can improve a performance of a die and a performance of an extruder including the die. And, one embodiment can improve a quality of a pellet manufactured by the extruder.

BRIEF DESCRIPTIONS OF THE DRAWINGS

BEST MODE FOR CARRYING OUT THE INVENTION

Hereinafter, embodiments will be described in detail with reference to the accompanying drawings. Note that components having the same function are denoted by the same reference signs throughout all the drawings for describing the embodiments, and the repetitive description thereof will be omitted. In addition, the description of the same or similar portions is not repeated in principle unless otherwise particularly required in the following embodiments.

Also, in some drawings used in the embodiments, hatching is omitted even in a cross-sectional view or hatching is used even in a plan view so as to make the drawings easy to see in some cases.

First Embodiment

Figure 1:
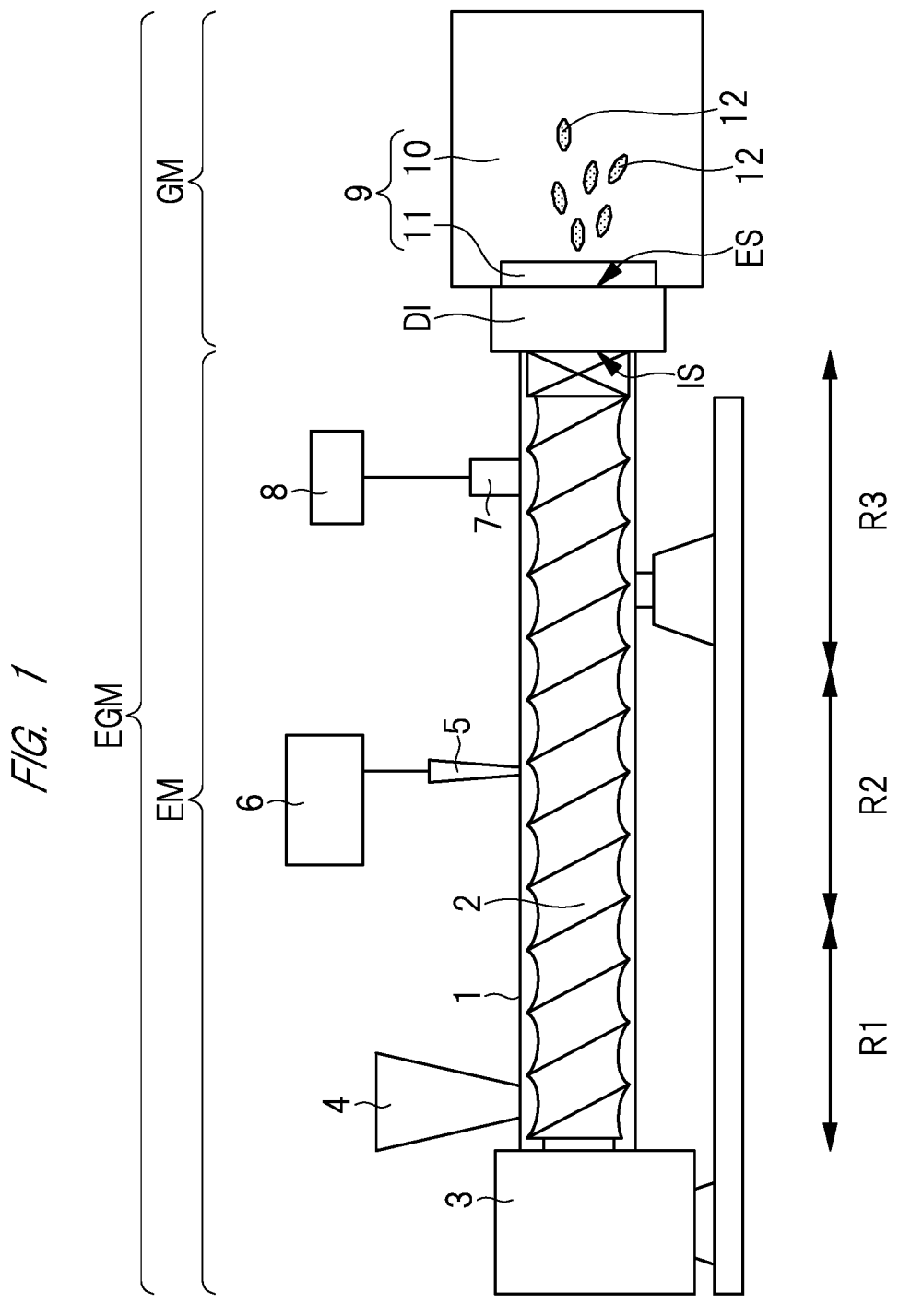
FIG. 1 is a schematic view showing an extruder in a first embodiment.

FIG. 1 is a schematic view showing an extruder EGM in a first embodiment. The extruder EGM includes a kneader EM and a granulator GM connected to a downstream end of the kneader EM. Principal characteristics of the first embodiment is a structure of a die DI included in the granulator GM. However, before explanation for the characteristics in detail, a structure of the extruder EGM and a method of manufacturing a pellet 12 formed by the extruder EGM will be explained below with reference to FIG. 1.

<Structure of Extruder EGM (Kneader EM and Granulator GM)>

As shown in FIG. 1, the kneader EM includes all or a part of a cylinder 1, a screw 2, a rotary mechanism 3, a raw-material feeder 4, a dispensing nozzle 5, a plunger pump 6, a vent 7 and a vacuum pump 8. Further, the number of each of the raw-material feeder 4, the dispensing nozzle 5, the plunger pump 6, the vent 7 and the vacuum pump 8 arranged in FIG. 1 is one. However, a plural number of each of them, the number being larger than one, may be arranged in some cases. The granulator GM includes the die DI and a pelletizer 9, and the pelletizer 9 includes a water tank 10 and a cutter holder 11. Note that a single-screw extruder is exemplified as the kneader EM in the first embodiment. However, the kneader EM may be a twin-screw extruder or an extruder including a plurality of screws more than two screws.

The screw 2 is arranged inside the cylinder 1, and the screw 2 is rotated by the rotary mechanism 3 connected to an upstream end of the cylinder 1. The rotary mechanism 3 is provided with a gear, a motor for rotating the gear and others, and rotates the screw 2 by rotating the gear connected to the screw 2.

A heat source not illustrated is arranged in periphery of the cylinder 1, and each region of the cylinder 1 is adjusted at a desirable temperature by the heat source. As an example of the heat source, an electrical heater or a heating medium (hot water, pressurized water, hot oil, hot silicon or others) is exemplified. However, the heat source is not limited to these examples, and may be a means heating the thermoplastic resin up to a temperature at which the thermoplastic resin can be melted. Further, a cooling source may be arranged in the periphery of the cylinder 1. As an example of the cooling source, water (cold water), air (air cooling) or others is exemplified. However, the cooling source is not limited to these examples, and may be a means cooling it down to a desirable temperature.

In FIG. 1, in a direction from the upstream (close to the rotary mechanism 3) toward the downstream (close to the die DI), the cylinder 1 has a plasticizing region R1, a kneading region R2 and a devolatilizing region R3 in this order. However, the configuration of the cylinder 1 is not limited to this. As described above, the number of each of the raw-material feeder 4, the dispensing nozzle 5, the plunger pump 6, the vent 7 and the vacuum pump 8 arranged in FIG. 1 is one. However, a plural number of each of them, the number being larger than one, may be arranged in some cases. The screw 2 may be made of combination of a screw shape having a function with a priority to feed the resin and/or an opposite screw shape having a function of intentionally slowing the feeding. Alternatively, in a portion having the vent in the cylinder 1, the screw 2 may be made of a screw shape not having the feeding function and specializing in the resin kneading or surface renewal for accelerating gasification and ventilation (devolatilization) of moisture or others in the resin. Further, the screw is not limited to these examples, and may be made of combination of screw shapes that are thought up by those who are skilled in the art of the extruders.

The raw-material feeder (hopper) 4 is arranged in the plasticizing region R1 of the cylinder 1, and the resin to be the raw material is fed from the raw-material feeder 4 into the cylinder 1.

The dispensing nozzle (injection nozzle) 5 for injecting an additive or others is arranged in the kneading region R2 of the cylinder 1, and the plunger pump 6 is connected to the dispensing nozzle 5. The additive or others is fed from the plunger pump 6 into the cylinder 1 through the dispensing nozzle 5. Further, a filler or a filler dispersion liquid may be fed into the cylinder 1.

The vent 7 is arranged in the devolatilizing region R3 of the cylinder 1, and the vacuum pump 8 is connected to the vent 7. The gaseous water in the devolatilizing region R3 is exhausted from the vent 7.

A downstream end of the cylinder 1 is connected to the die DI of the granulator GM. The die DI is attached to the pelletizer 9 including the water tank (circulation box) 10 and the cutter holder 11. An injection surface (upstream surface) IS of the die DI is connected to the downstream end of the cylinder 1, and the extrusion surface (downstream surface) ES of the die DI opposite to the injection surface IS is arranged in the water tank 10. The water tank 10 is filled with liquid that is called pellet circulating water (PCW). In this example, the liquid making the pellet circulating water is water.

The cutter holder 11 is arranged inside the water tank 10 to be near the extrusion surface ES of the die DI. The cutter holder 11 is provided with a plurality of cutters facing the extrusion surface ES of the die DI, and the resin material that is extruded from the extrusion surface ES into the water is cut by the cutters, and is divided into the plurality of pellets 12.

<Method of Manufacturing Pellet 12>

First, in the plasticizing region R1, the resin to be the raw material is fed from the raw-material feeder 4 into the cylinder 1, and the resin is plasticized and kneaded (mixed) by the screw 2. In this manner, the molten resin based on the resin is formed, and the molten resin is carried to the kneading region R2.

A thermoplastic resin is applicable as the resin to be the raw material. The thermoplastic resin is, for example, polypropylene, polyethylene, polyamide, polyethylene terephthalate or polyimide. The resin in the first embodiment may be single thermoplastic resin, a mixture containing two or more thermoplastic resins, or the mixture containing the filler.

The kneaded molten resin is injected from the injection surface IS into the injection hole inside the die DI, and is extruded from the extrusion surface ES through the nozzle communicating with the injection hole to the water tank 10 of the pelletizer 9.

The extruded molten resin is sequentially cut by the cutters attached to the cutter holder 11 near the extrusion surface ES, and is cooled in the water tank 10. In this manner, the molten resin is divided into the plurality of (granular) pellets 12. Then, the plurality of pellets 12 are carried to outside the water tank 10. As described above, the plurality of pellets 12 can be provided by the usage of the extruder EGM in the first embodiment.

Note that at least the step of injecting the kneaded material into the die DI and the step of extruding the kneaded material to the water tank 10 are performed in a state in which a later-described heat source HT inside the die DI is driven to heat the peripheries of the injection hole and the nozzle.

<Structure of Die DI>

With reference to FIGS. 2 to 5, a structure of the die (die plate) DI in the first embodiment will be explained below.

Figure 2:
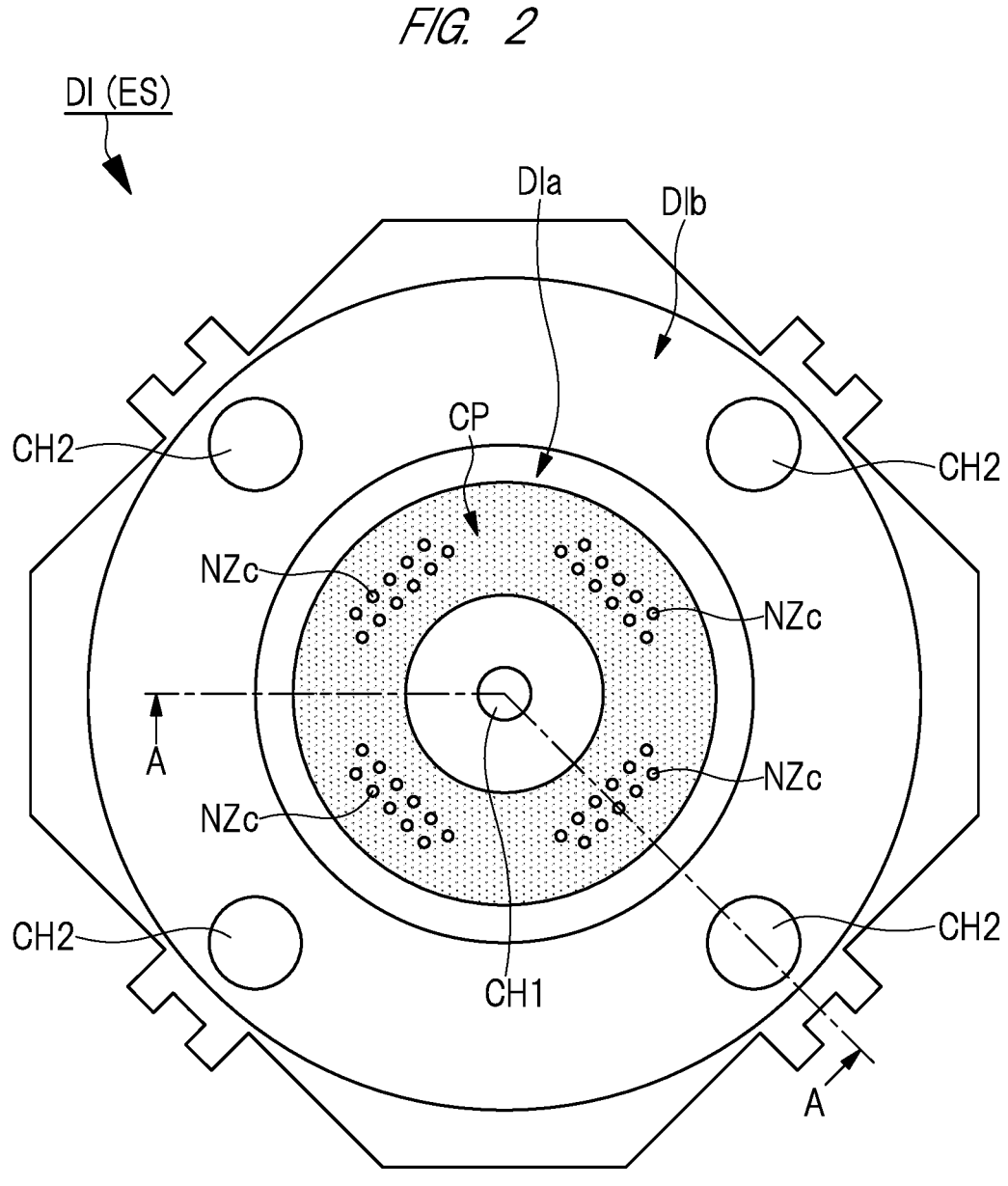
FIG. 2 is a plan view showing a die in the first embodiment.
Figure 3:
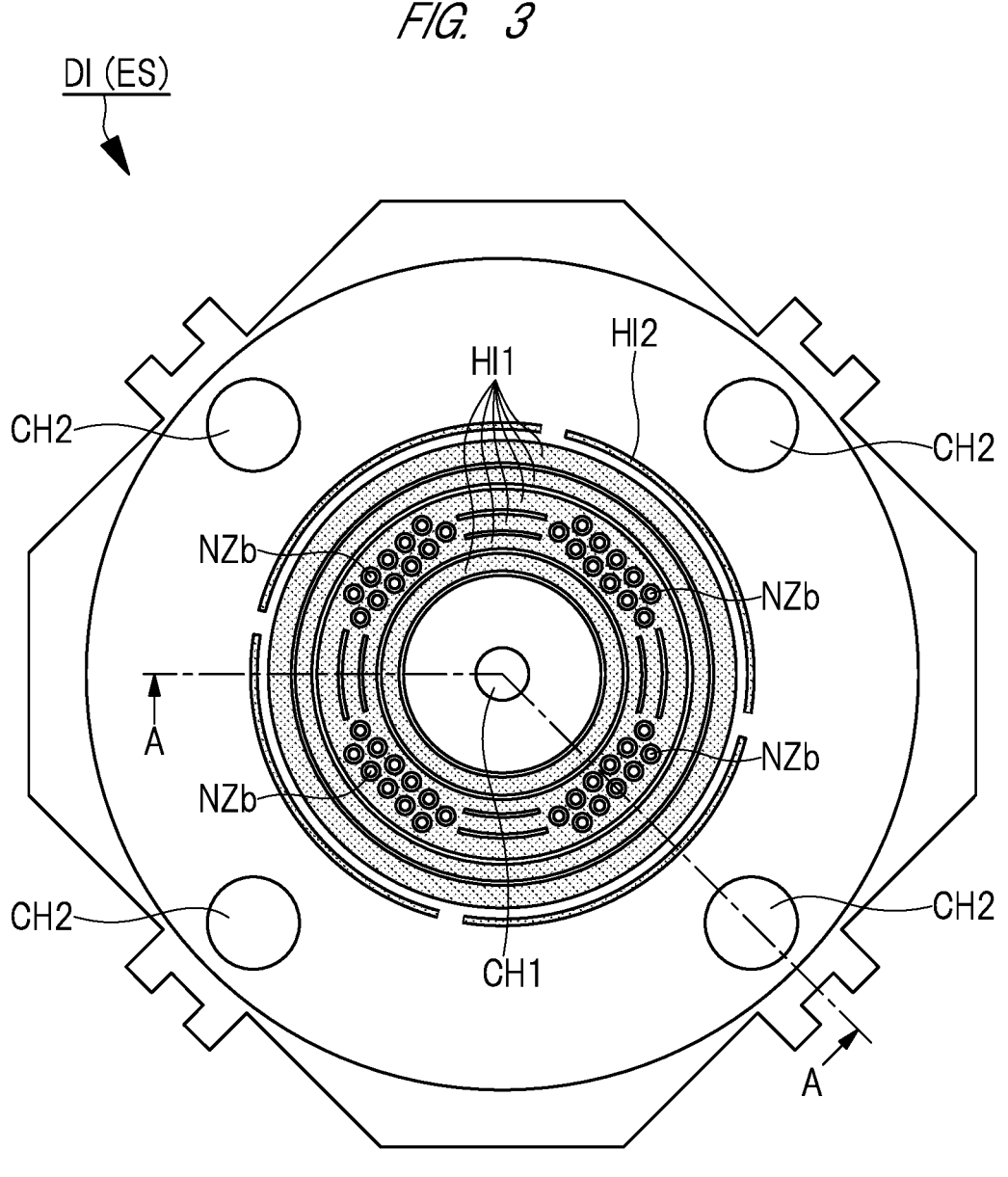
FIG. 3 is a plan view showing a die in the first embodiment.
Figure 4:
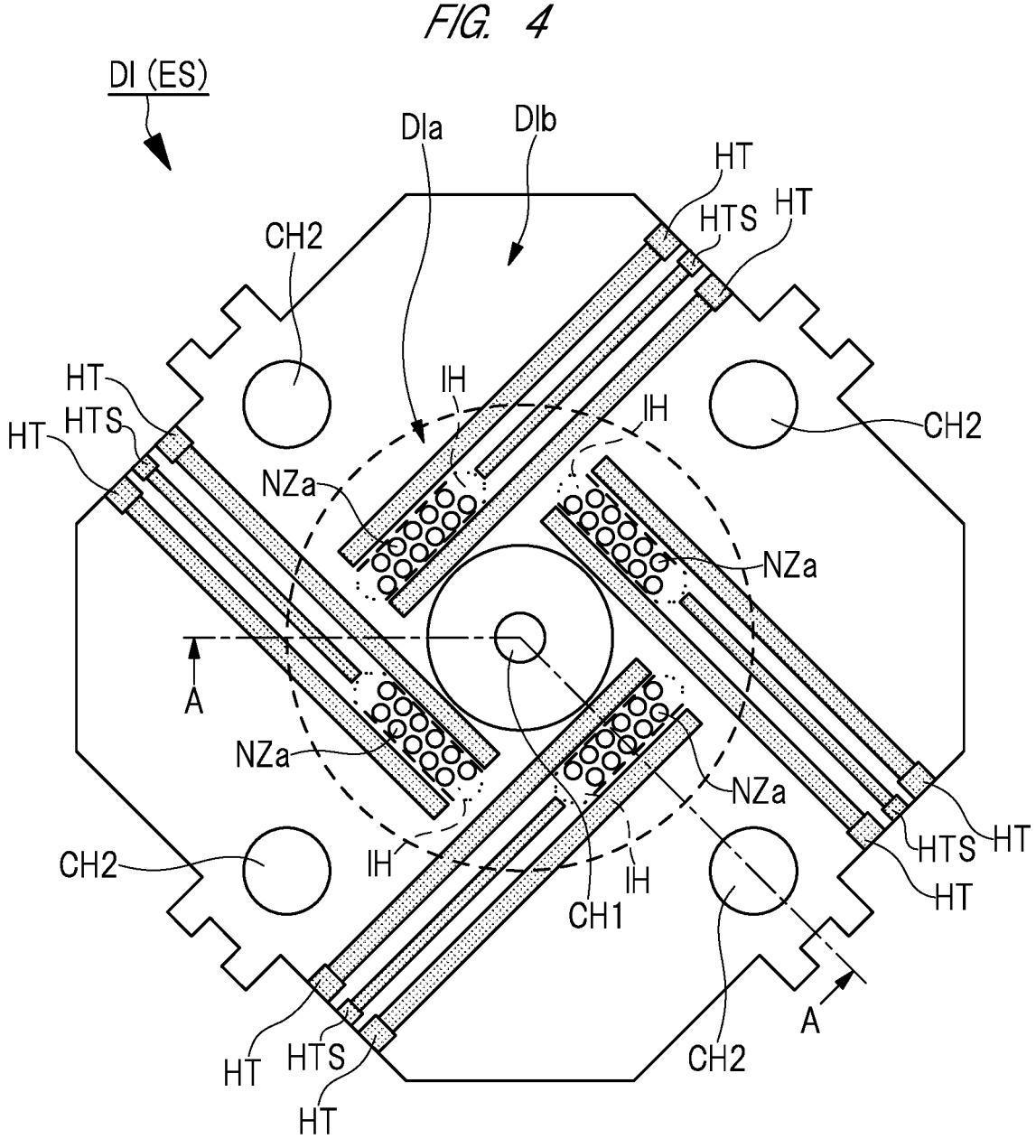
FIG. 4 is a plan view showing a die in the first embodiment.
Figure 5:
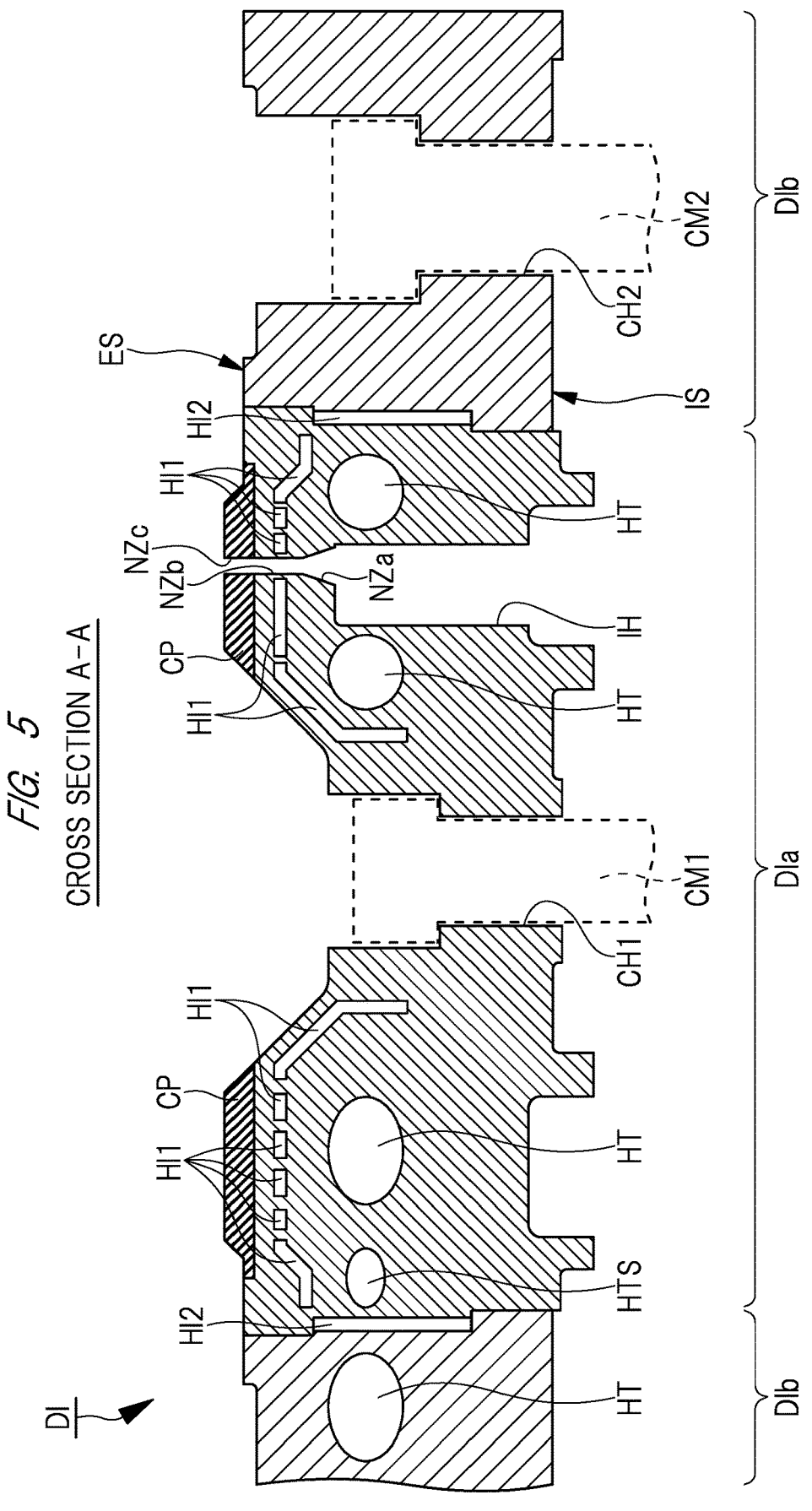
FIG. 5 is a cross-sectional view showing a die in the first embodiment.

Each of FIGS. 2 to 4 is a plan view of the die DI viewed from the extrusion surface ES, and FIG. 5 is a cross-sectional view taken along a line A-A shown in FIGS. 2 to 4. In a thickness direction of the die DI (a direction heading from the extrusion surface ES toward the injection surface IS), planes of FIGS. 3 and 4 are different in positions from a plane of FIG. 2, and show the inside of the die DI to be an inner structure of FIG. 2. The hard plate (hardening member) CP is illustrated with hatching in FIG. 2, a heat insulating layer HI1 and a heat insulating layer HI2 are illustrated with hatching in FIG. 3, and the heat source HT and a heat sensor HTS are illustrated with hatching in FIG. 4. A structure of FIG. 4 is supposed to use the electrical heater (cartridge heater) as the example of the heat source HT.

In explanation for the structure of the die DI in the present application, the term "plane" means a plane in parallel to the extrusion surface ES or the injection surface IS, and the term "plan view" means viewing from the extrusion surface ES or the injection surface IS. The term "cross section" means a plane in vertical to the extrusion surface ES or the injection surface IS, and the term "cross-sectional view" means viewing the vertical plane. In the present application, for convenience of the explanation, each component in the cross-sectional view may be explained in a state in which the injection surface IS is on a lower side while the extrusion surface ES is on an upper side.

In the present application, the term "injection surface IS" means the entire surface of the die DI close to the cylinder 1 (the upstream side), and the term "extrusion surface ES" means the entire surface of the die DI close to the water tank 10 (the downstream side). However, if these surfaces are more strictly defined, the "injection surface IS" is a surface of the die DI on which the injection hole IH opens, and the "extrusion surface ES" is a surface of the die DI on which a nozzle NZb opens or a surface of the hard plate CP on which a nozzle NZc opens.

As shown in FIGS. 2 and 5, the die DI includes a center member DIa and an outer peripheral member DIb surrounding the center member DIa in a plan view. The center member DIa and the outer peripheral member DIb are separately-manufactured members, and are bonded to each other to be unified by weld or others. The center member DIa and the outer peripheral member DIb are made of, for example, stainless steel, but may be made of a different material from each other.

The die DI has connection holes CH1 and CH2 for use in connection with other members such as the cylinder 1. In this example, a center of the center member DIa has one connection hole CH1 penetrating the center member DIa, and the outer peripheral member DIb has four connection holes CH2 penetrating the outer peripheral member DIb. When connection members CM1 and CM2 such as a bolt are arranged in the respective connection holes CH1 and CH2 as shown with a broken line in FIG. 5, the die DI and the cylinder 1 are connected to each other.

Since the cutter of the cutter holder 11 is movable in the region of the extrusion surface ES, note that a peripheral portion of the connection holes CH1 and CH2 is recessed to be closer to the injection surface IS than other portions in order to prevent the connection holes CH1 and CH2 from being cut because of protruding.

The die DI includes the hard plate CP that is arranged on a surface of the center member DIa, the surface being close to the extrusion surface ES, and that is made of a material having a higher hardness than that of a material of the center member DIa. The hard plate CP is made of, for example, a material containing titanium carbon (TiC), and has a thickness of, for example, 4 to 5 mm. The hard plate CP and the center member DIa are bonded to each other by, for example, brazing using a self-fluxing alloy. Since the hard plate CP having such hardness is arranged to be close to the extrusion surface ES, a risk of cutting of the center member DIa by the cutter of the cutter holder 11 can be suppressed.

As shown in FIGS. 2 to 5, the hard plate CP is provided with the nozzle NZc, and the center member DIa is provided with the nozzle NZa, the nozzle NZb and the injection hole IH. The nozzles NZa to NZc are nozzles that communicate with one another and are unified. The injection hole IH communicates with the plurality of nozzles NZa to NZc that are unified. The molten resin in the region being close to the injection surface IS injected from the cylinder 1 is injected to the injection hole IH, and is extruded from the extrusion surface ES through the nozzles NZa to NZc to the water tank 10.

The injection hole IH is formed from the surface of the center member DIa, the surface being close to the injection surface IS, into the center member DIa, has a relatively wide opening area, and is connected to the plurality of nozzles NZa.

The nozzle NZa is formed inside the center member DIa, and is connected to the injection hole IH and the nozzle NZb. An opening diameter (opening area) of the nozzle NZa is gradually smaller when being closer from the injection surface IS toward the extrusion surface ES.

The nozzle NZb is formed from the surface of the center member DIa, the surface being close to the extrusion surface ES, into the center member DIa, and is connected to the injection hole IH through the nozzles NZa. An opening diameter (opening area) of the nozzle NZb is smaller than the opening diameter of the nozzle NZa except in a connecting portion between the nozzle NZa and the nozzle NZb. In other words, an average opening diameter of the nozzle NZb is smaller than an average opening diameter of the nozzle NZa.

The nozzle NZc penetrates the hard plate CP and is connected to the nozzle NZb. An opening diameter (opening area) of the nozzle NZc is the same as the opening diameter of the nozzle NZb or smaller than the opening diameter of the nozzle NZb.

In the first embodiment, note that the nozzle NZa having the consecutively-reducing opening diameter is arranged between the injection hole IH and the nozzle NZb. However, not only the nozzle NZa but also a plurality of nozzles having different average opening diameter may be arranged between the injection hole IH and the nozzle NZb. In other words, direct connection of the nozzle NZa with the injection hole IH and the nozzle NZb is unnecessary, and a different nozzle may be arranged between the injection hole IH and the nozzle NZa and between the nozzle NZa and the nozzle NZb.

As shown in FIGS. 4 and 5, the die DI mainly includes the plurality of heat sources HT for heating the peripheries of the injection hole IH and the nozzles NZa to NZc and the heat sensor HTS for measuring the temperature in the plurality of heat sources HT. Each of the heat sources HT is arranged not to directly be in contact to the injection hole IH and the nozzles NZa to NZc, and arranged at a position not overlapping the injection hole IH and the nozzles NZa to NZc in a plan view. Two heat sources HT adjacent to the nozzles NZa to NZc are positioned to be opposite to each other to sandwich the injection hole IH and the nozzles NZa to NZc therebetween.

The heat source HT in the first embodiment is made of a hole formed in the outer peripheral member DIb and the center member DIa and a heating mechanism that is arranged inside the hole. As such a heating mechanism, an electrical heater using a coil, a heat transfer bar or others, hot oil, steam or others is exemplified. When the hot oil or the steam is used as the heating mechanism, for example, the two holes having ends that are adjacent to and communicate with each other to sandwich the heat sensor HTS therebetween can be also used as a circulation route. In this case, one of the holes may be used as the injection port, and the other of the holes may be used as the vent port. In the present application, such communicating holes and the hot oil or the steam circulating in the holes are included in the heat source HT.

As shown in FIGS. 3 and 5, the die DI includes the plurality of heat insulating layers HI1 and the plurality of heat insulating layers HI2. Each of the plurality of heat insulating layers HI1 is formed inside the center member DIa, and has an annular shape in a plan view. This annular shape is a circular shape taking center of the connection hole CH1 as a center axis although not particularly limited. In a cross-sectional view, each thickness of the plurality of heat insulating layers HI1 is, for example, 1 to 2 mm. In a plan view, each width of the plurality of heat insulating layers HI1 is, for example, 8 to 10 mm, and a width between the adjacent heat insulating layers HI1 is, for example, 1 to 2 mm.

Each of the heat insulating layers HI1 has a lower thermal conductivity than those of materials making the center member DIa and the hard plate CP. For example, each of the heat insulating layers HI1 is made of a hole formed in the center member DIa and inert gas such as air or argon existing inside the hole. An inner pressure of the hole is atmospheric pressure or a reduced or vacuumed pressure to be lower than the atmospheric pressure. Although explained in detail later, the hole making the plurality of heat insulating layers HI1 is connected to a dusting hole DH reaching outside the center member DIa.

As shown in FIG. 3, a part of the plurality of heat insulating layers HI1 may be connected to each other in a plan view. All or a part of the plurality of heat insulating layers HI1 may be connected to each other or may be isolated from each other.

A plurality of heat insulating layers HI2 are formed on a side surface of the center member DIa, and surround the plurality of heat insulating layers HI1 in a plan view. Each of the plurality of heat insulating layers HI2 is formed as a closed space having a lower thermal conductivity than those of materials making the center member DIa and the hard plate CP. The space can be filled with the inert gas such as air or argon. As the pressure of the space, atmospheric pressure is appliable, or the reduced or vacuumed pressure that is lower than the atmospheric pressure is also applicable.

When the reduced or vacuumed pressure that is lower than the atmospheric pressure is applied for each inside of the plurality of heat insulating layers HI1 and the plurality of heat insulating layers HI2, the heat insulating effect that is higher than that in a case of each inside with the atmospheric pressure can be provided.

Main characteristics of the first embodiment are the plurality of heat insulating layers HI1 and the plurality of heat insulating layers HI2 formed in the die DI, and the characteristics can increase the equality of the size of the resin material sequentially extruded from the die DI, and can suppress a risk of the clogging due to reduction in the temperature of the resin material inside the nozzles NZa to NZc. Such characteristics will be explained in detail below. <Characteristics of Die DI Desired by Present Inventors>

As described above, the resin materials that are kneaded inside the cylinder 1 are extruded to the water tank 10 through the nozzles NZa to NZc that are close to the extrusion surface ES of the die DI, and are divided into the plurality of pellets 12 by the cutter that is arranged in the cutter holder 11. At this stage, the water tank 10 is filled with, for example, water, and has a temperature of about 60° C. The resin material is cooled in the periphery of the extrusion surface ES, and the resin material is hardened to some extent or a viscosity of the resin materials is increased, and therefore, the resin material is easily cut by the cutter.

On the other hand, the resin material inside each of the injection hole IH and the nozzles NZa to NZc preferably has certain viscosity allowing the resin material to be stably extruded from the extrusion surface ES. Therefore, the die DI is provided with the plurality of heat sources HT, and the temperature of each heat source HT is set at a suitable temperature for a resin type.

In this case, the hard plate CP is in direct contact with the water tank 10. Therefore, in a region with a certain thickness from the surface of the hard plate CP, the cooling effect made by the water tank 10 is more significant than the heating effect made by the heat sources HT. And, each opening diameter of the nozzles NZc and NZb that almost define the size (diameter) of the pellet 12 is small and is about 3 to 4 mm. Therefore, if the resin material is hardened inside the nozzle NZa having a larger opening diameter or inside the nozzle NZb close to the nozzle NZa, the resin material is difficult to be extruded from the extrusion surface ES, and the clogging occurs inside the nozzle NZb or inside the nozzle NZc.

If the resin remains inside the injection hole IH and the nozzles NZa to NZc at the time of the end of working of the extruder EGM, the resin that is hardened because of remaining exists in this portion at the time of the restart of the extruder EGM. In this case, if the heating effect made by the heat sources HT is insufficient, the hardened resin becomes a risk of a cause of the clogging.

The die DI is provided with the plurality of nozzles NZa to NZc that are unified. If the nozzles NZa to NZc have various peripheral temperatures, variation tends to occur among degrees of the clogging in the nozzles NZa to NZc. Alternatively, the nozzles NZa to NZc without the clogging and the nozzles NZa to NZc with the clogging may be mixed. In this case, the size of the pellet 12 extruded through the nozzles NZa to NZc varies. Therefore, it is difficult to manufacture the plurality of pellets 12 having the equal size.

In summarization of the above description, in the die DI, it is necessary to suppress the clogging of the nozzles NZa to NZc, and increase the equality of the size of the pellet 12 extruded through the nozzles NZa to NZc. Therefore, the resin material reaching the region that is as close to the water tank 10 as possible preferably has the viscosity, and the viscosity of the resin material immediately before being extruded to the water tank 10 is preferably high to some extent causing the resin to be hardened or to be suitable for the cutting.

For example, in other specific words with reference to the structure of the first embodiment, the resin inside each of the nozzles NZa to NZc preferably has the viscosity, and the resin in the region from the vicinity of a boundary between the nozzles NZb and NZc to the inside of the nozzle NZc is preferably hardened. That is, the heat of the heat source HT is preferably transmitted to the periphery of the end nozzle NZb of the center member DIa. And, the peripheral temperatures of the plurality of nozzles NZa to NZc that are unified are preferably as equal as possible.

<Main Characteristics of Die DI>

As shown in FIGS. 3 to 5, the main characteristics of the die DI of the first embodiment are the plurality of heat insulating layers HI1 and the plurality of heat insulating layers HI2 arranged in the peripheries of the plurality of nozzles NZb and the plurality of heat sources HT.

One of the plurality of heat insulating layers HI1 is arranged in the peripheries of the plurality of nozzles NZb, and is arranged above the heat source HT. That is, the one is adjacent to the plurality of nozzles NZb in a cross-sectional view, and is closer to the extrusion surface ES than the heat source HT.

The other of the plurality of heat insulating layers HI1 is adjacent to the heat source HT close to the connection hole CH1, and is between the heat source HT and the connection hole CH1. That is, the other is arranged to cover an upper portion and a side portion of the heat source HT in a cross-sectional view. In other words, at a position farther than the heat source HT from the nozzles NZa to NZc, the other extends in a direction from the extrusion surface ES toward the injection surface IS, and is arranged from an end of the heat source HT close to the extrusion surface ES to an end of the heat source HT close to the injection surface IS.

Each of the plurality of heat insulating layers HI2 is arranged at a boundary between the center member DIa and the outer peripheral member DIb, and is adjacent to the heat source HT close to the connection hole CH1. That is, each of the plurality of heat insulating layers HI2 is arranged between the heat source HT and the connection hole CH2, and is arranged to cover a side portion of the heat source HT in a cross-sectional view. In other words, at a position farther than the heat source HT from the nozzles NZa to NZc, the heat insulating layer HI2 extends in a direction from the extrusion surface ES toward the injection surface IS, and is arranged from an end of the heat source HT close to the extrusion surface ES to an end of the heat source HT close to the injection surface IS.

Figure 6:
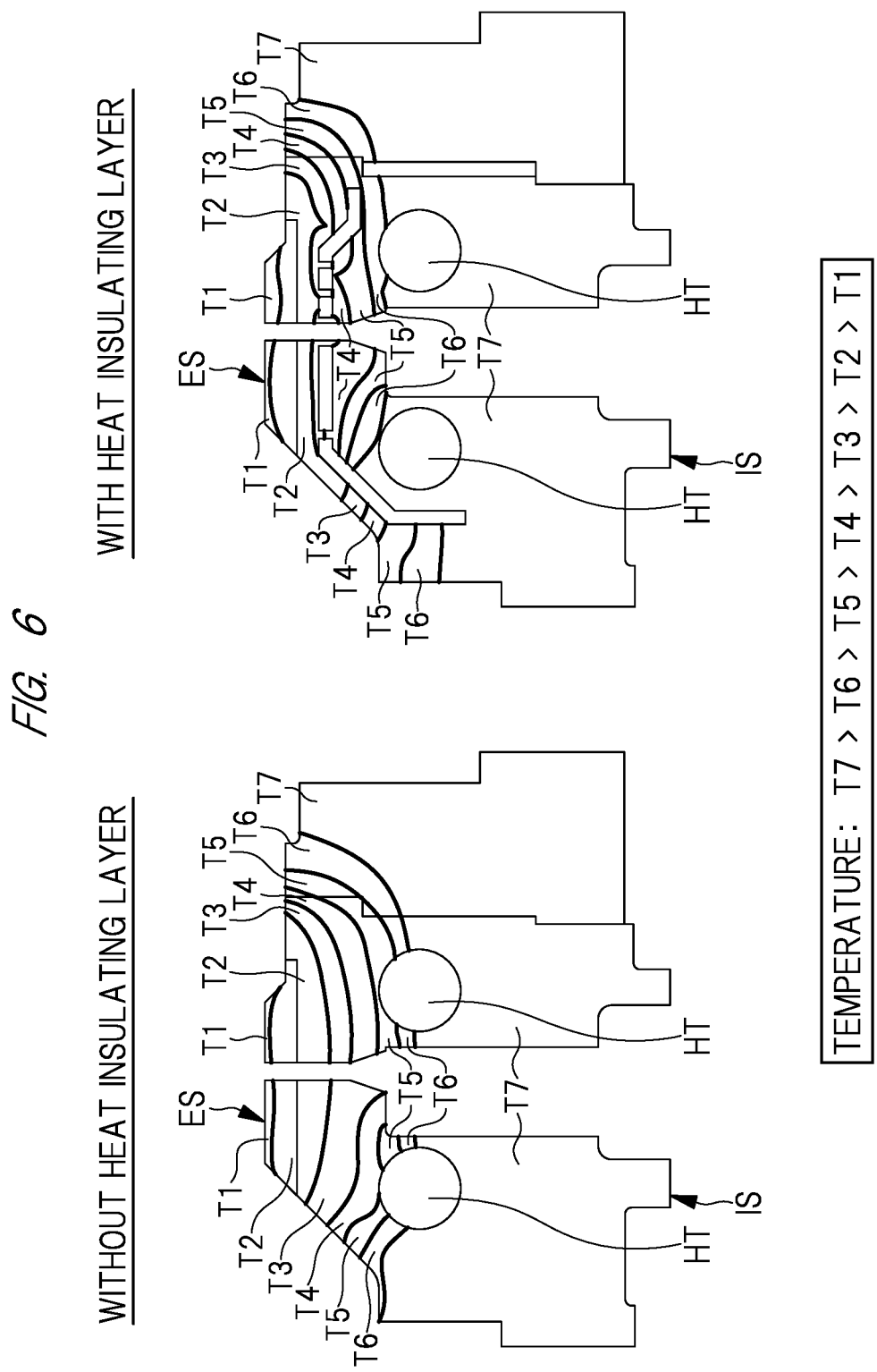
FIG. 6 is a schematic view showing an experimental result made by the inventors of the present application.
Figure 7:
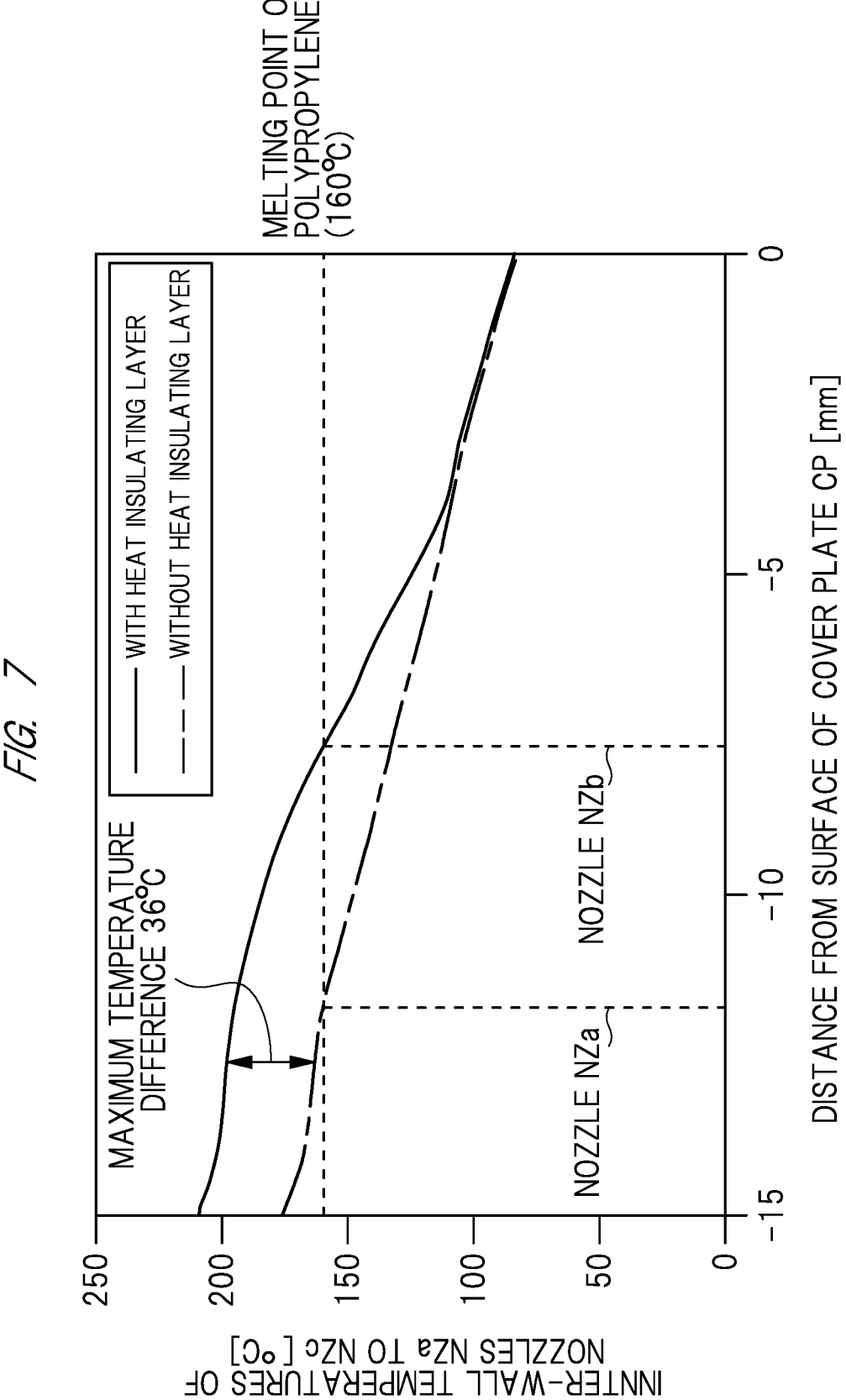
FIG. 7 is a graph showing an experimental result made by the inventors of the present invention.

FIG. 6 is a schematic view showing experimental results made by the present inventors, and shows a temperature distribution in a case with the heat insulating layer (the heat insulating layer HI1 and the heat insulating layer HI2)

arranged in the die DI and a case without it. FIG. 7 is a graph of the summarization of the experimental results of FIG. 6, and shows a relation between the temperature and the distance from the surface (extrusion surface ES) of the hard plate CP.

As understood from FIG. 6, in the case "without the heat insulating layer", the closer to the extrusion surface ES the position is, the lower the inner temperature of the die DI is. In other words, the position close to the heat source HT has a higher temperature T7. The closer to the extrusion surface ES the position is, the lower down to temperatures T6 to T1 the inner temperature is.

On the other hand, in the case "with the heat insulating layer" as described in the first embodiment, since the plurality of heat insulating layers HI1 are arranged in the periphery of the nozzle NZb, the peripheral temperatures of the injection hole IH and the nozzles NZa and NZb are maintained at a higher temperature than those of the case "without the heat insulating layer". Therefore, it is found that the cooling effect caused from the extrusion surface ES is suppressed.

In the case "with the heat insulating layer", since the side portion of the heat source HT is covered with the heat insulating layer HI1 or the heat insulating layer HI2, the peripheral temperature of the heat source HT is maintained at a higher temperature than that of the case "without the heat insulating layer".

Although the die DI is provided with the connection holes CH1 and CH2 as described above, the peripherals of the connection holes CH1 and CH2 are formed to recess to be closer to the injection surface IS than other portions to avoid the connection members CM to be cut by the cutter holder 11. In other words, opening surfaces of the connection holes CH1 and CH2 are closer to the injection surface IS than opening surfaces of the nozzle NZc (the nozzle NZb). Therefore, the peripherals of the connection holes CH1 and CH2 have larger areas in contact with the water of the water tank 10. Therefore, the heat source HT closer to the connection holes CH1 and CH2 than the injection hole IH and the nozzles NZa to NZc is under an easily cooling state.

However, in the first embodiment, each heat source HT is difficult to be cooled since the heat insulating layer HI1 is between the heat source HT and the connection hole CH1 while the heat insulating layer HI2 is between the heat source HT and the connection hole CH2. Therefore, the heat of the heat source HT is easily transmitted to the injection hole IH and the nozzles NZa to NZc, and the variation is difficult to occur among the peripheral temperatures of the plurality of nozzles NZa to NZc that are unified. Therefore, the equality of the sizes of the plurality of pellets 12 extruded through the nozzles NZa to NZc can be improved. In other words, the quality of the plurality of pellets 12 can be improved.

Note that the part of the die DI in the direct contact with the water tank 10 may be not the entire extrusion surface ES of the die DI but only the center member DIa or only the portion with the hard plate CP. In other words, in consideration of a viewpoint of reduction in the area of the cooled extrusion surface ES and a viewpoint of only necessity of the manufacture of the pellets 12, it is also considerable that only the periphery of the nozzle NZc is connected with the water tank 10.

In this case, since the connection hole CH2 is not in contact with the water, the heat insulating layer HI2 seems to be unnecessary. However, it is considerable that parts of the die DI other than the part in contact with the water tank 10 are also under environment where the outer temperature of the die DI is low. In this case, the heat source HT is easily cooled from the outside of the die DI. Therefore, also in consideration of such a case, it is preferable to arrange the heat insulating layer HI2 between the heat source HT and the connection hole CH2.

As shown in FIG. 7, the temperature of the region close to the extrusion surface ES is not almost different between the case "without the heat insulating layer" and the case "with the heat insulating layer". However, an inter-wall temperature of each of the nozzle NZa and the nozzle NZb in the case "with the heat insulating layer" is higher than that in the case "without the heat insulating layer". The maximum temperature difference between the case "without the heat insulating layer" and the case "with the heat insulating layer" was about 36° C.

FIG. 7 shows that the resin is polypropylene as a supposition case, and also shows a melting point (160° C.) of the polypropylene for reference. As understood from FIG. 7, in the case "without the heat insulating layer", the hardening of the polypropylene inside the nozzle NZa having the relatively wide opening diameter starts. Therefore, there is a risk of occurrence of the clogging inside the nozzle NZb or the nozzle NZc having the relatively narrow opening diameter. On the other hand, in the case "with the heat insulating layer", the hardening of the polypropylene inside the nozzle NZb starts, and therefore, the risk of the occurrence of the clogging is suppressed. Therefore, by usage of the die DI of the first embodiment, the risk of the occurrence of the clogging inside the nozzle NZb or the nozzle NZc can be suppressed. In other words, by usage of the technique disclosed in the first embodiment, the performance of the die DI and the performance of the extruder EGM including the die DI can be improved. And, the equality of the size of the pellet 12 manufactured by the extruder EGM can be improved, and the quality of the pellet 12 can be improved.

Even if the hardened resin remains inside the injection hole IH and the nozzles NZa to NZc at the time of the restart of the extruder EGM, the hardened resin is easily melted since the heat of the heat source HT is rapidly transmitted to the extrusion surface ES. Therefore, the occurrence of the clogging due to the remaining resin can be suppressed.

Note that the case of usage of the polypropylene as the raw material has been explained for the example. However, even if other resin described above is the raw material, the usage of the heat insulating layer HI1 and the heat insulating layer HI2 of the first embodiment can provide each of the above-described effects.

<Method of Manufacturing Die DI and Other Characteristics of Die DI>

Incidentally, the center member DIa of the die DI of the first embodiment is preferably manufactured by a 3-D printer. For example, a powder-adhering stacking method is exemplified as a manufacturing method using the 3-D printer, the method packing and layering power made of a metallic material, and then, adding a binder to the powder to harden the powder by a powder-sintering stacking method for directly sintering the powder or an inkjet method using high-power laser beam, electrical discharge or others.

Note that each of the heat insulating layer HI1, the heat insulating layer HI2, the dusting hole DH, the heat source HT and the heat sensor HTS immediately after the manufacturing of the center member DIa is simply a hole (space) formed inside the center member DIa. However, in order to easily understand the explanation, such a hole will be explained as each of the above-described components below.

The outer peripheral member DIb and the hard plate CP are prepared before and after the manufacturing of the center member DIa using the 3-D printer. The outer peripheral member DIb and the hard plate CP are prepared to be separate from the center member DIa, but may be also manufactured by the 3-D printer.

After the center member DIa, the outer peripheral member DIb and the hard plate CP are prepared, the center member DIa and the outer peripheral member DIb are bonded to each other by the weld as described above so that the center member DIa is surrounded by the outer peripheral member DIb. In this case, a closed space is formed as the heat insulating layer HI2 in a part between the center member DIa and the outer peripheral member DIb.

The center member DIa and the hard plate CP are bonded to each other by the brazing so that the hard plate CP is arranged in the surface of the center member DIa, the surface being close to the extrusion surface ES. The die DI of the first embodiment is manufactured as described above.

When the center member DIa is manufactured by the 3-D printer, the heat insulating layer HI1 that is hollow can be easily formed inside the center member DIa. Since the center member DIa including the heat insulating layer HI1 is formed to be unified, strength of the entire center member DIa can be enhanced.

For example, as a related-art technique, a method of forming the heat insulating layer HI1 by manufacturing two half-separating members of the hole to be the heat insulating layer HI1 and welding these two members is considerable. However, it is very difficult to weld the plurality of heat insulating layers HI1 to form the heat insulating layer HI1 having good dimensional accuracy. Also, the plurality of heat insulating layers HI1 include not only the heat insulating layer HI1 in parallel to the extrusion surface ES but also the heat insulating layer HI1 being adjacent to the heat source HT and extending in the direction from the extrusion surface ES toward the injection surface IS. Therefore, it is necessary to further separate the center member DIa into a plurality of members for each time and weld these members, and therefore, manufacturing steps are complicated. And, because of the separation into the plurality of members, the strength of the entire center member DIa is also reduced. The center member DIa of the first embodiment is formed to be unified by the 3-D printer, and therefore, such a problem can be solved.

When the center member DIa is manufactured by the 3-D printer, the powder for use in the manufacturing may remain in a part of the center member DIa. Particularly, since the heat insulating layer HI1 has the hollow structure, the remaining of the powder inside the heat insulating layer HI1 makes difficult to completely remove the powder. The powder-filled inner state of the heat insulating layer HI1 means reduction in the entire volume of the heat insulating layer HI1, and means reduction in the heat insulating effect in the die DI. Therefore, it is necessary to make a devise for removing the powder as much as possible.

Figure 8:
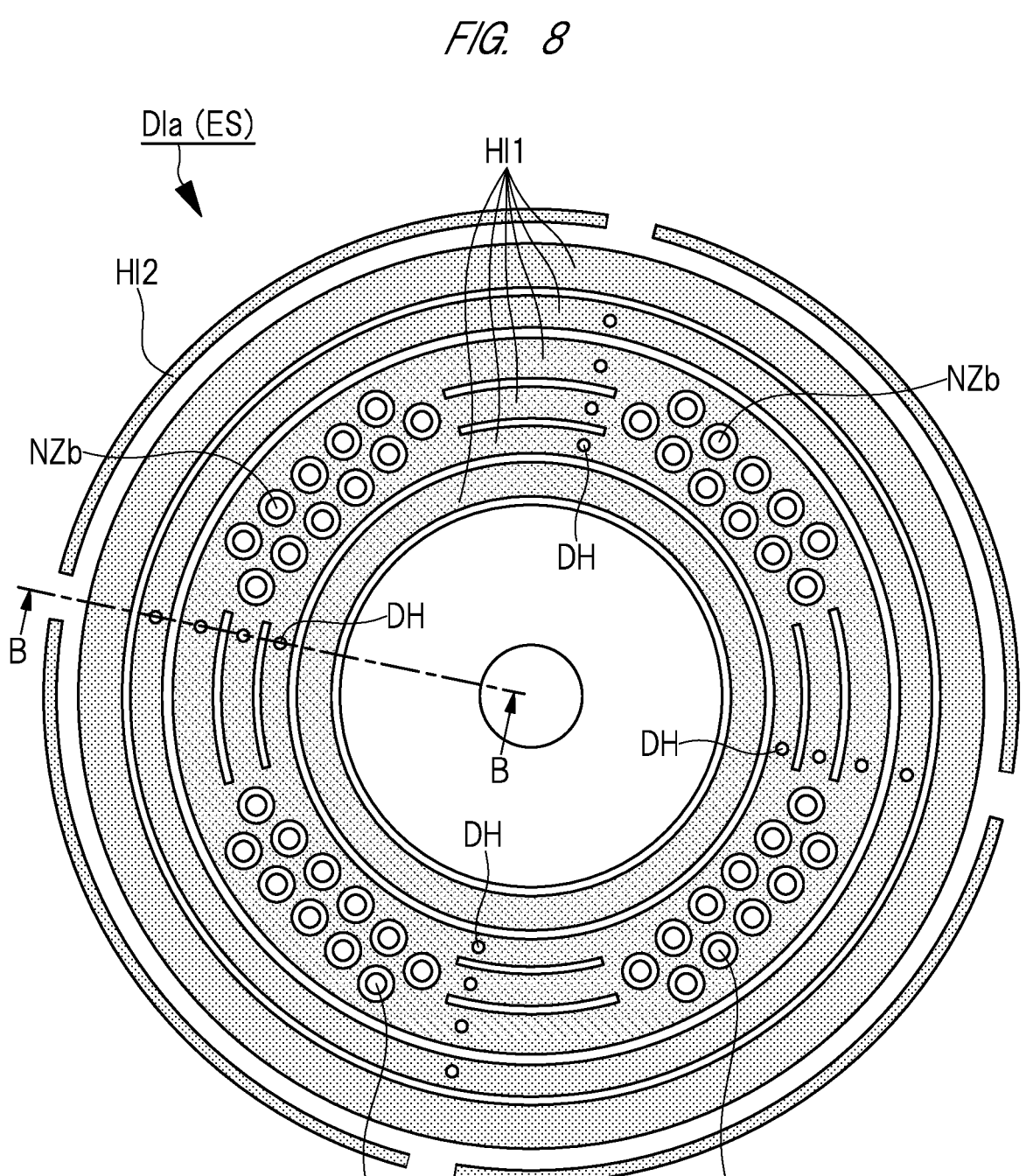
FIG. 8 is a plan view showing a center member of the die in the first embodiment.
Figure 9:
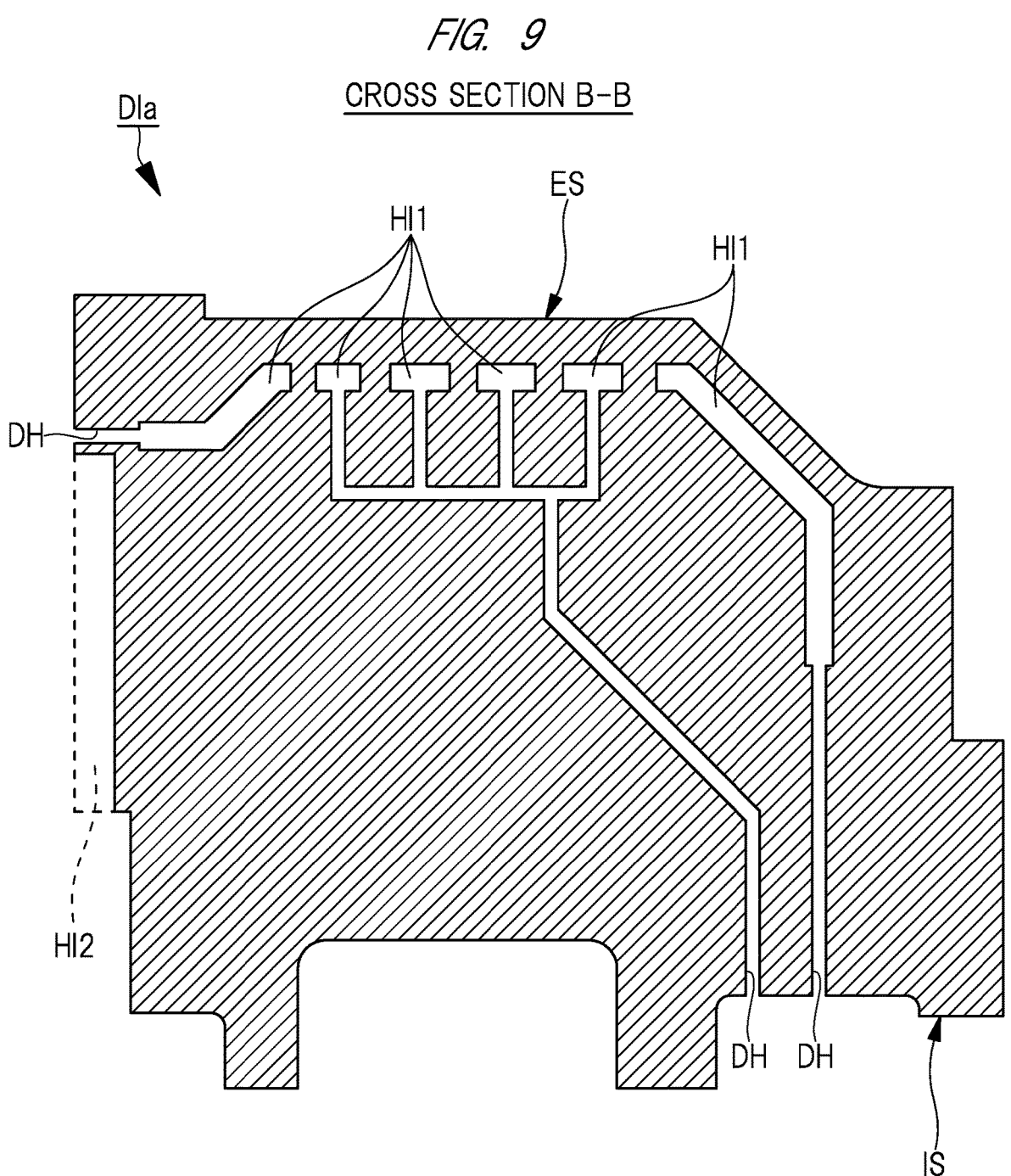
FIG. 9 is a cross-sectional view showing the center member of the die in the first embodiment.

FIG. 8 is an enlarged plan view showing the plurality of heat insulating layers HI1 of the center member DIa of the die DI. FIG. 9 is a cross-sectional view taken along a line B-B shown in FIG. 8.

As shown in FIGS. 8 and 9, a part of each of the plurality of heat insulating layers HI1 has the dusting hole DH. An opening of the dusting hole DH is very narrow to be narrower than a thickness of the heat insulating layer HI1 in a cross-sectional view, a width of the heat insulating layer HI1 in a plan view or an opening of the nozzle NZb. The dusting hole DH is connected to a hole making the heat insulating layer HI1, and a portion of the dusting hole close to, for example, the injection surface IS or the side surface of the center member DIa communicates with outside of the center member DIa.

After the center member DIa is manufactured, a dusting process is performed to the inside of the hole making the heat insulating layer HI1 through the dusting hole DH. After the dusting process, an outlet of the dusting hole DH is closed. In other words, as a final structure, the dusting hole DH is connected to the plurality of heat insulating layers HI1 and extends from the plurality of heat insulating layers HI1 toward the side surface of the center member DIa or the injection surface IS, while the outlet of the dusting hole DH is closed.

Second Embodiment

Figure 10:
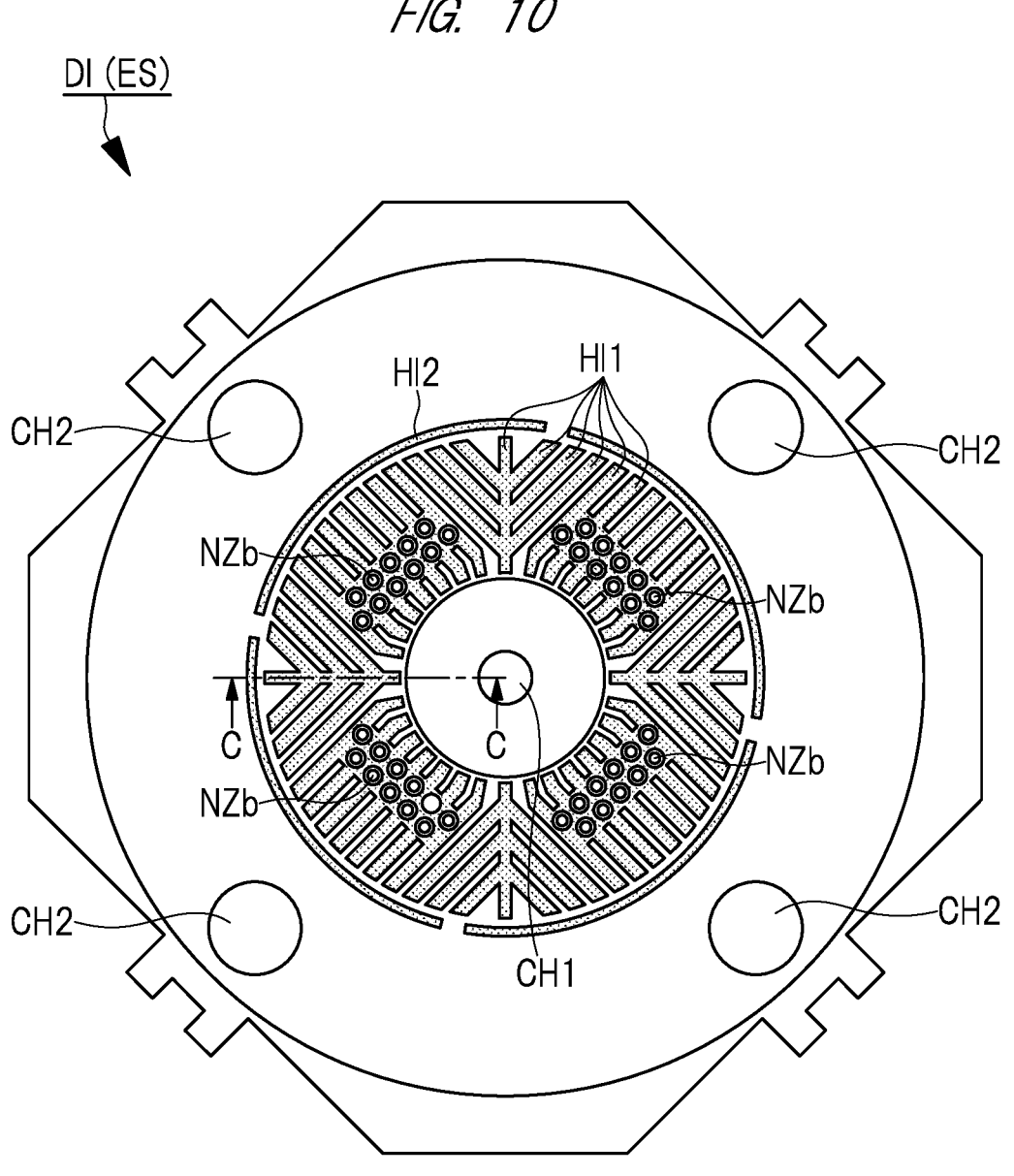
FIG. 10 is a plan view showing a die in a second embodiment.
Figure 11:
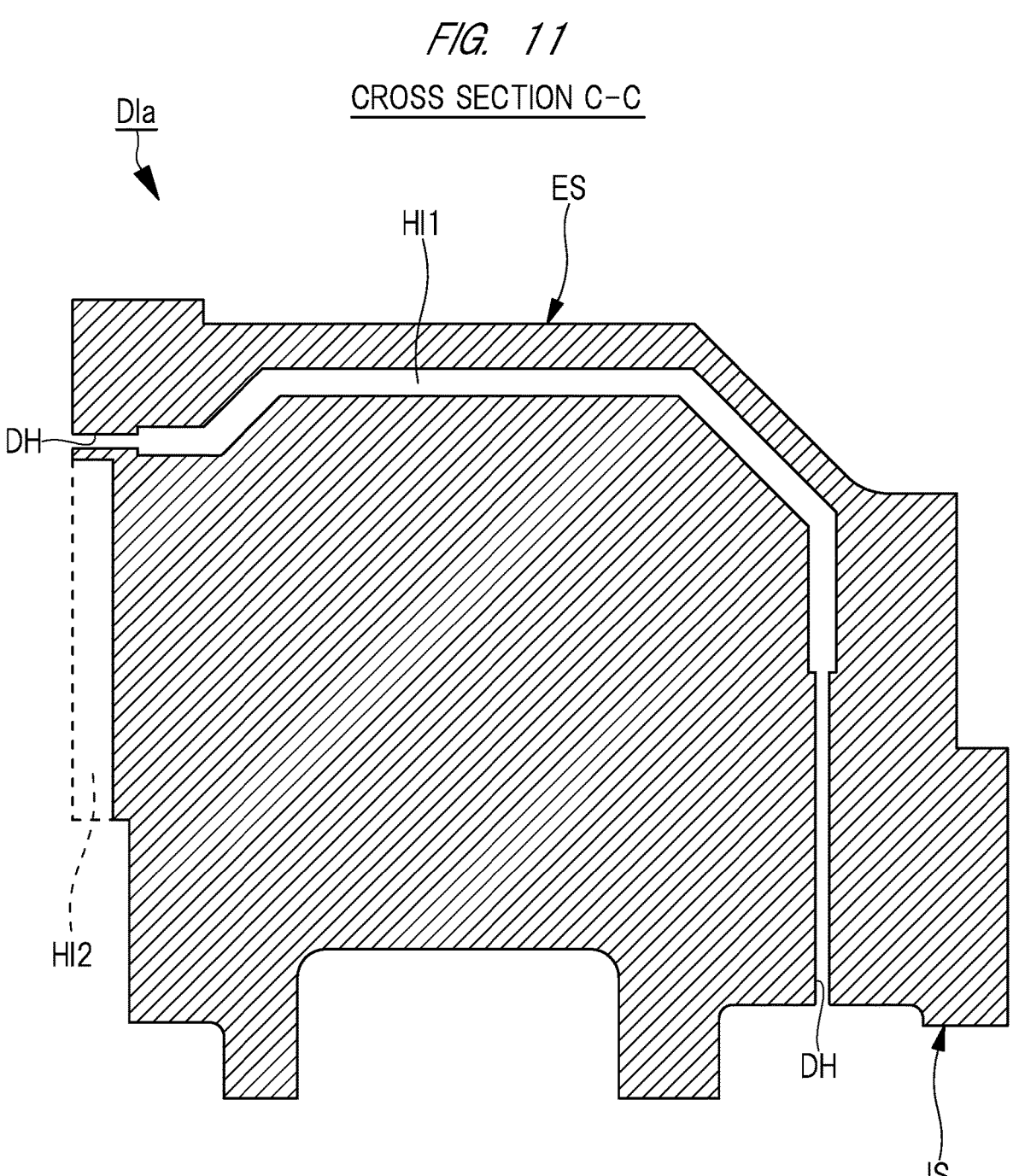
FIG. 11 is a cross-sectional view showing a center member of the die in the second embodiment.

A die DI of the second embodiment will be explained below with reference to FIGS. 10 and 11. In the following explanation, note that differences from the first embodiment will be mainly explained. FIG. 10 is a plan view of the die DI viewed from the extrusion surface ES, and corresponds to FIG. 3 used in the first embodiment. In FIG. 10, the heat insulating layer HI1 and the heat insulating layer HI2 are illustrated with hatching. FIG. 11 is a cross-sectional view taken along a line C-C shown in FIG. 10.

In the first embodiment, each of the plurality of heat insulating layers HI1 and HI2 is annular in a plan view as shown in FIGS. 3 and 8. In the second embodiment, the plurality of heat insulating layers HI1 are radially formed to extend in a direction from a center (connection hole CH1) of the center member DIa toward the outside of the center member DIa in a plan view as shown in FIG. 10. The heat insulating layer HI2 is arranged on the side surface of the center member DIa to surround the plurality of heat insulating layers HI1 in a plan view.

Even in the second embodiment, the dusting hole DH is formed inside the center member DIa as shown in FIG. 11. The dusting hole DH is connected to the heat insulating layer HI1, and a portion of the dusting hole close to the injection surface IS or close to the side surface of the center member DIa communicates with the outside of the center member DIa. Even in the second embodiment, note that the outlet of the dusting hole DH is closed after the dusting process.

In the foregoing, the present invention has been concretely described on the basis of the embodiments. However, the present invention is not limited to the foregoing embodiments, and various modifications can be made within the scope of the present invention.

INDUSTRIAL APPLICABILITY

Explanation of Reference Characters 1 cylinder
2 screw
3 rotary mechanism
4 raw-material feeder
5 dispensing nozzle
6 plunger pump
7 vent
8 vacuum pump
9 pelletizer
10 water tank
11 cutter holder
12 pellet
CH connection hole CM1, CM2 connection member
CP hard plate (hard member)
DH dusting hole
DI die (die plate)
DIa center member
DIb outer peripheral member
EM kneader
EGM extruder
ES extrusion surface (downstream surface)
GM granulator
HI1, HI2 heat insulating layer
HT heat source
HTS heat sensor
IH injection hole
IS injection surface (upstream surface)
NZa, NZb and Nzc nozzle
R1 plasticizing region
R2 kneading region
R3 devolatilizing region

The invention claimed is:

1. A die having an extrusion surface and an injection surface opposite to the extrusion surface, comprising:
   a first member made of a first metallic material;
   an injection hole formed from a first surface of the first member into the first member, the first surface of the first member being closer to the injection surface than the extrusion surface;
   a first nozzle formed inside the first member and connected to the injection hole;
   a second nozzle formed from a second surface of the first member into the first member, the second surface of the first member being closer to the extrusion surface than the injection surface, connected to the first nozzle, and having a smaller average opening diameter than an average opening diameter of the first nozzle; and
   a first heat source arranged inside the first member not to overlap the first nozzle and the second nozzle in a plan view viewed from the extrusion surface,
   wherein a plurality of first holes are formed inside the first member so as to be away from the first heat source, each of the plurality of first holes having an annular shape in the plan view and being formed as an enclosed space filled with air or an inert gas, the plurality of first holes forming first heat insulating layers having a lower thermal conductivity than a thermal conductivity of the first metallic material,
   one of the plurality of first holes is adjacent to the second nozzle and is closer to the extrusion surface than the first heat source,
   the other of the plurality of first holes extends in a direction from the extrusion surface toward the injection surface at a position that is farther from the second nozzle than the first heat source.

2. The die according to claim 1,
   wherein
   an inner pressure of the first holes is an atmospheric pressure or a reduced or vacuumed pressure to be lower than the atmospheric pressure.

3. The die according to claim 1 further comprising:
   a second hole arranged inside the first member, connected to the first holes, and extending from the first holes toward a side surface of the first member or the injection surface.

4. The die according to claim 1 further comprising:
   a hard plate arranged on the second surface and having higher hardness than a hardness of the first metallic material, wherein a third nozzle penetrating the hard plate and connected to the second nozzle is formed in the hard plate.

5. The die according to claim 1,
wherein a first connection hole is arranged in a center of the first member to penetrate the first member, and
the other of the plurality of first heat insulating layers is arranged between the first heat source and the first connection hole.

6. The die according to claim 5,
wherein each of the first heat insulating layers extends in a direction heading from the first connection hole toward outside the first member in the plan view.

7. The die according to claim 5 further comprising:
a second member bonded to the first member to surround the first member in the plan view,
wherein a second connection hole is arranged in the second member to penetrate the second member,
a second heat source is arranged inside the first member not to overlap the first nozzle and the second nozzle in the plan view,
the first heat source and the second heat source are opposite to each other to sandwich the first nozzle and the second nozzle therebetween, and
a second heat insulating layer having a lower thermal conductivity than a thermal conductivity of the first metallic material is arranged between the second heat source and the second connection hole.

8. The die according to claim 7,
wherein the second heat insulating layer is formed as a closed first space between the first member and the second member, and
the first space is filled with air or inert gas.

9. The die according to claim 7,
wherein the second heat insulating layer is formed as a closed first space between the first member and the second member, and
a pressure of the first space is an atmospheric pressure or a reduced or vacuumed pressure to be lower than the atmospheric pressure.

10. The die according to claim 1,
wherein the first metallic material is stainless steel.

11. The die according to claim 1,
wherein the first heat source is made of a fourth hole formed inside the first member and a heating mechanism arranged inside the fourth hole, and
the heating mechanism is an electrical heat source using a coil or a heat transfer bar, hot oil or steam.

12. An extruder including the die according to claim 1 comprising:
a cylinder including a screw;
a rotatory mechanism connected to an upstream end of the cylinder;
a raw-material feeder arranged in a first region of the cylinder;
the die including the injection surface connected to a downstream end of the cylinder;
a water tank attached to the die to include the extrusion surface of the die therein; and
a cutter holder attached into the water tank and including a plurality of cutters facing the extrusion surface of the die.

* * * * *